W. H. KEYS.
PACKING RING.
APPLICATION FILED JULY 1, 1915.
1,188,455.   Patented June 27, 1916.
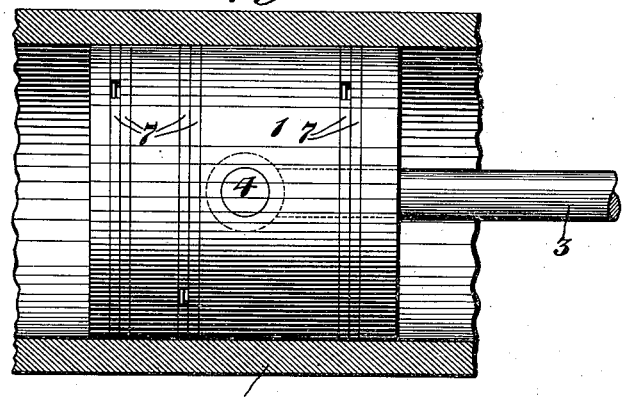
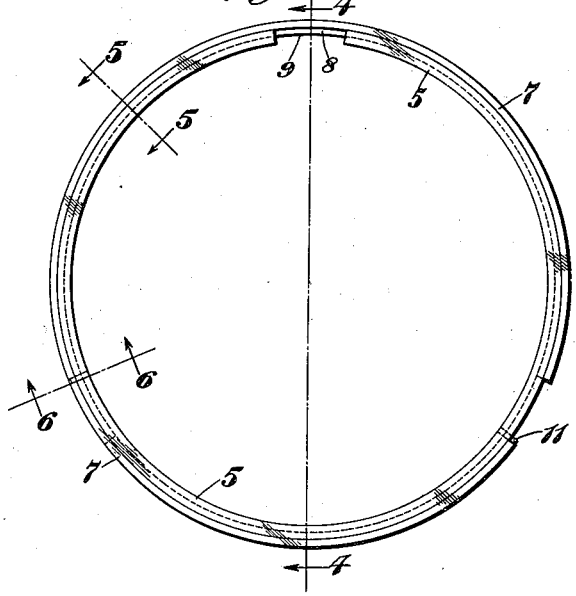
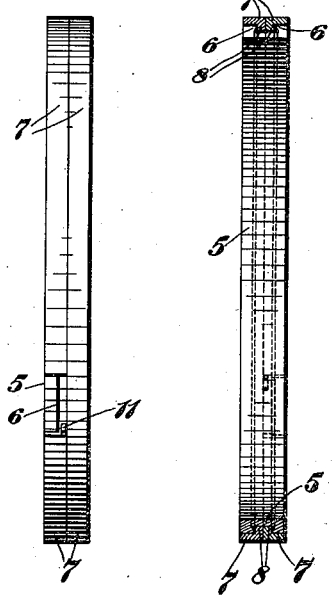
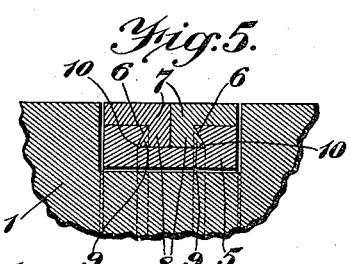
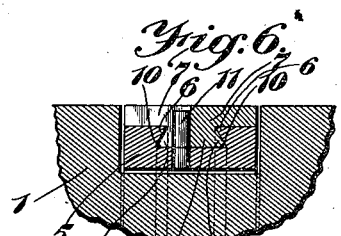
Attest:
Charles A. Becker
N. S. Butler
Inventor
William H. Keys
by His Attorneys

UNITED STATES PATENT OFFICE.

WILLIAM H. KEYS, OF ST. LOUIS, MISSOURI.

PACKING-RING.

1,188,455.  Specification of Letters Patent.  Patented June 27, 1916.

Application filed July 1, 1915. Serial No. 37,542.

*To all whom it may concern:*

Be it known that I, WILLIAM H. KEYS, a citizen of the United States, residing at the city of St. Louis and State of Missouri, have invented a new and useful Packing-Ring, of which the following is a specification.

This invention relates to packing rings for reciprocating pistons.

An object of the invention is to provide an improved packing for reciprocating pistons comprising an inner expanding ring of the open resilient type provided with a circumferential groove, the side walls of which are obliquely disposed so that the bottom of the groove is of greater width than the width of the groove at the periphery of the ring, in combination with a number of outer rings of the open resilient type encircling said inner ring and having extended portions seated in said groove, which extended portions are provided with obliquely disposed walls on their outer sides coöperating with the oblique walls of said groove, whereby the ends of said outer rings are permanently retained in substantial annular alinement positively preventing the engagement or fouling of the ends of the outer rings with the cylinder ports during the reciprocation of the piston.

The various other objects and advantages will appear from the following detailed description, reference being made to the accompanying drawing in which I illustrate the preferred embodiment of the packing and in which—

Figure 1 is a sectional view of a cylinder having a cylindrical piston operatively mounted therein and provided with the usual number of packings, constructed in accordance with the present invention. Fig. 2 is a side elevation of the ring before being compressed in the cylinder. Fig. 3 is a view looking toward the periphery of the ring. Fig. 4 is a sectional view on the line 4—4 of Fig. 2. Figs. 5 and 6 are sectional views enlarged with respect to the preceding views of the drawing and taken on the lines 5—5 and 6—6 respectively of Fig. 2.

The piston 1 is of the usual reciprocating type adapted to operate within a cylinder 2 and arranged to transmit power to the driven mechanism by means of a piston rod 3 pivotally connected to the piston at 4 in the usual manner. The piston is provided with any desired number of circumferential grooves, each of which is adapted to receive a packing device consisting of the several interlocked rings of the open resilient type which move back and forth with the piston and press against the interior surface of the cylinder conforming with any irregularities in the formation thereof to prevent escape or passage of the operating fluid by which the piston is moved.

The packing comprises an inner ring 5 of the open resilient type adapted to seat within any one of the grooves in the piston and which is constructed so as to exert outward pressure against the encircling outer rings, thus coöperating with the latter to conform the peripheries thereof with any varying portions of the cylinder.

The ring 5 is provided with a circumferential groove, the side walls of which are obliquely disposed so that the width of the groove at the periphery of the ring is less than the width of the groove at the bottom wall thereof, thus forming substantially V-shaped projections 6. To coöperate with the inner ring I have provided two outer rings 7 of the open resilient type which encircle the inner ring and the combined width of which is the same, or approximately the same, as the width of said inner ring, all of which will be readily understood by reference to Figs. 5 and 6.

Each of the rings 7 is provided with an inwardly extending portion 8, and the side walls of said rings 7 and the inwardly extending portions 8 bear against each other, while the inner surfaces of said inwardly extending portions 8 bear against the bottom wall of the groove in the ring 5 in which they are seated.

The outer walls of the inwardly extending portions 8 are obliquely disposed, thus providing substantially V-shaped projections 9 which engage in the V-shaped grooves formed by the oblique walls below the projections 6 of the inner ring. By this arrangement lateral movement of any of the rings with respect to each other is positively prevented and it will also be understood that the open ends of the outer rings are positively locked in annular alinement so that it is impossible for the ends of either of the outer rings to extend outwardly so as to become caught or fouled in the ports of the cylinder during reciprocation of the piston.

As illustrated in Figs. 5 and 6, the outer corners of the V-shaped projections 9 may be cut away to provide passages 10 which will serve as passages for a lubricant, thus permitting the lubricant to pass between the inner and outer rings and to work around between all abutting surfaces of the several rings and thereby prevent sticking or adhesion of any of the rings.

The outer rings are placed upon the inner ring so that the open ends of the latter are crossed by the body portions of the outer rings, and the open ends of each outer ring are placed at a considerable distance from the ends of the other outer ring so that the space between the ends of one ring is closed by the body of the coöperating ring. To prevent movement of the rings from the positions aforesaid, I provide an abutment 11 for each of the outer rings, said abutment consisting of a suitable projection rigid with the inner ring and extending between the open ends of the outer rings respectively, thus preventing rotation of the outer rings with respect to each other and with respect to the inner ring.

The rings are preferably cut from a cylinder of slightly larger diameter than the interior of the cylinder in which they are to be mounted when in use, so that it is necessary to compress said rings slightly when upon the piston in order to place them within the engine cylinder. The resiliency of the rings being thus provided by compression thereof is constantly exerted to retain the peripheries of the outer rings against the interior surface of the cylinder, and since both of the outer rings are locked in connection with the inner ring, the entire resiliency of all of the rings is utilized and exerted upon each individual ring.

The advantages of a ring thus constructed, in which complete coöperation between the several parts thereof is permanently maintained and in which it is made impossible for the ends of the rings to catch or foul with the cylinder ports, are obvious. It will be understood that I do not restrict myself to precise details or proportions, but that variations may be made within equivalent limitations without departure from the spirit and scope of the invention.

What I claim and desire to secure by Letters Patent of the United States is:—

1. A packing comprising an inner expansion ring, having a circumferential groove, two outer expansion rings encircling said inner ring and having a combined width equal to the width of said inner ring, projecting portions on said outer rings seated in said groove, laterally extending portions on said outer rings, and extending portions on said inner ring at the sides of said groove engaging with said laterally extending portions and preventing expansion of the outer rings, for the purposes described.

2. A packing comprising an inner ring having a circumferential groove intermediate of the side edges thereof, both of the side walls of said groove being oblique and converging outwardly from the bottom of the groove, two outer rings having their inner edges abutting together and having a combined width equal to the width of said ring encircling said inner ring and each having a projection extending into said groove, each of said projections being provided with an oblique side wall engaging under the adjacent oblique side wall of said groove, whereby said outer rings are positively locked as to their lateral movement and limited as to their expanding movement with respect to said inner ring.

3. A packing comprising an inner ring having a circumferential groove intermediate of the side edges thereof, both of the side walls of said groove being oblique and converging outwardly from the bottom of the groove, two outer rings having their inner edges abutting together and having a combined width equal to the width of said ring encircling said inner ring and each having a projection extending into said groove, each of said projections being provided with an oblique side wall engaging under the adjacent oblique side wall of said groove, whereby said outer rings are positively locked as to their lateral movement and limited as to their expanding movement with respect to said inner ring.

In witness whereof, I have signed this specification in the presence of two subscribing witnesses.

WILLIAM H. KEYS.

Witnesses:
N. G. BUTLER,
L. C. KINGSLAND.